United States Patent [19]

Sommer

[11] Patent Number: 5,285,879
[45] Date of Patent: Feb. 15, 1994

[54] ELECTRICAL ACTUATED MULTI-SPEED DRIVE APPARATUS

[75] Inventor: Gordon M. Sommer, Grosse Pointe Farms, Mich.

[73] Assignee: Midwest Brake Bond Co., Warren, Mich.

[21] Appl. No.: 920,248

[22] Filed: Jul. 27, 1992

[51] Int. Cl.⁵ .................. F16D 67/06; F16H 37/06
[52] U.S. Cl. .................... 192/94; 192/18 B; 192/18 A; 74/661
[58] Field of Search .......... 192/0.094, 18 A, 18 B, 192/90, 0.09, 0.092; 74/661

[56] References Cited

U.S. PATENT DOCUMENTS

| | | | |
|---|---|---|---|
| 4,125,178 | 11/1978 | Monks | 192/18 A |
| 4,494,635 | 1/1985 | Sommer | 192/12 C |
| 4,506,772 | 3/1985 | Sommer | 192/18 A |
| 4,592,251 | 6/1986 | Mason | 192/18 B X |
| 4,616,739 | 10/1986 | Sommer | 192/18 A |
| 4,765,448 | 8/1988 | Sommer | 192/18 A |
| 4,921,078 | 5/1990 | Sommer | 188/171 |
| 5,172,798 | 12/1992 | Mabee | 192/18 B |
| 5,195,623 | 3/1993 | Sommer | 192/18 B |

Primary Examiner—Leslie A. Braun
Assistant Examiner—Andrea Pitts
Attorney, Agent, or Firm—Harness, Dickey & Pierce

[57] ABSTRACT

There is provided a two-speed drive unit for a motor drive, the motor drive having a housing and a main rotatable member. The two-speed drive unit comprises a two-speed drive housing secured to the motor drive housing and a secondary motor secured to the two-speed drive housing. The driveshaft of the secondary motor extends into the two-speed drive housing. The two-speed drive unit further comprises a gear train operably associated with both the secondary motor driveshaft and a clutch, the clutch being disposed between the gear train and the rotatable member of the main motor drive for engagement and disengagement of the gear train with the rotatable member of the main motor drive. The clutch is normally engaged by a plurality of coil springs and disengaged by the action of an AC voltage coil. Control means are provided which are capable of storing predetermined positions of the motor drive at which engagement or disengagement of the two-speed drive is desired.

16 Claims, 4 Drawing Sheets

ELECTRICAL ACTUATED MULTI-SPEED DRIVE APPARATUS

BACKGROUND OF THE INVENTION

The present invention relates generally to two-speed drives using computer technology for adaptive control of the unit. More particularly, the present invention relates to a main motor, a clutch and gear set between the main motor and a secondary motor, the secondary motor having a brake.

The present invention has application on a wide variety of machinery requiring either high-speed, precision indexing or feed drives requiring high speed approach to a work piece and then adjustable slow speed to perform an operation on the work piece with a precision stop. Typical applications for the present invention operating in the precision index mode include index tables, transfer bars, positioning drives, index type conveyors, rotary sheet feeders and linear sheet feeders. A typical application for the present invention operating in the high speed approach with a slow speed work cycle is the feed drive for the machining heads used in automated transfer machining lines.

Various two-speed drive units have been developed but all require the use of multiple limit switches to control the various sequences of the cycle. These units have two major drawbacks. The first drawback is that the productivity and accuracy of the driven machine depends upon the skill of the setup man and/or operator in the setting of the limit switches. The second drawback is the positioning accuracy of the various elements of the complete cycle. In essence, limit switches determine when a certain function will start. The resulting position at which the function is completed is thus variable due to small changes such as frictional load on the driven machine and the effects of ambient, machine and drive temperatures. With the present invention, the position where a function is to be completed is given to the computer and the computer determines on a cycle-to-cycle basis when each function of a multi-function cycle is to start.

Two speed drive systems have been used in indexing applications only when absolutely necessary to achieve better positioning accuracy than possible with a single speed system. The reason for this is the loss of productivity when using a two speed drive system. Accordingly, it is one object of the present invention to increase the productivity of the driven machine using a two speed drive system to nearly the same productivity as with a single speed system. Another object of the present invention is to increase the final positioning accuracy.

Two speed drives are commonly used for the feed drive of machining heads in automated lines. Another object of the present invention is to more accurately position the machining head at high speed to a position just before the work piece is contacted thus increasing productivity. In order to achieve depth control of the tools machining the work piece, it is often necessary to build stops into the machine. The necessity to do this causes other problems due to the sudden stopping of the machine inertia. Another object of the present invention is to increase the accuracy of depth control of the tools so the stops are not necessary.

Another object of the present invention is to provide a two speed drive that can also be used as a single speed drive unit without mechanical modifications. Another object of the present invention is to use the same mechanical control equipment in a wide variety of applications without user programming. This is achieved by inserting another preprogrammed EPROM into the control board.

Another object of the present invention is to eliminate the use of air that is used on many other two speed drives. Experience shows that 40-60 percent of all maintenance problems are caused by dirty or improper air.

Further objects of the present invention are to provide an improved two speed drive system that is simple and compact in design, economical to produce and extremely rugged and maintenance free during operation.

Further objects, features and advantages of the present invention will become apparent from the analysis of the following written specification, the accompanying drawings and the appended claims.

DETAILED DESCRIPTION OF THE PREFERRED EMBODIMENT

Figure 1:
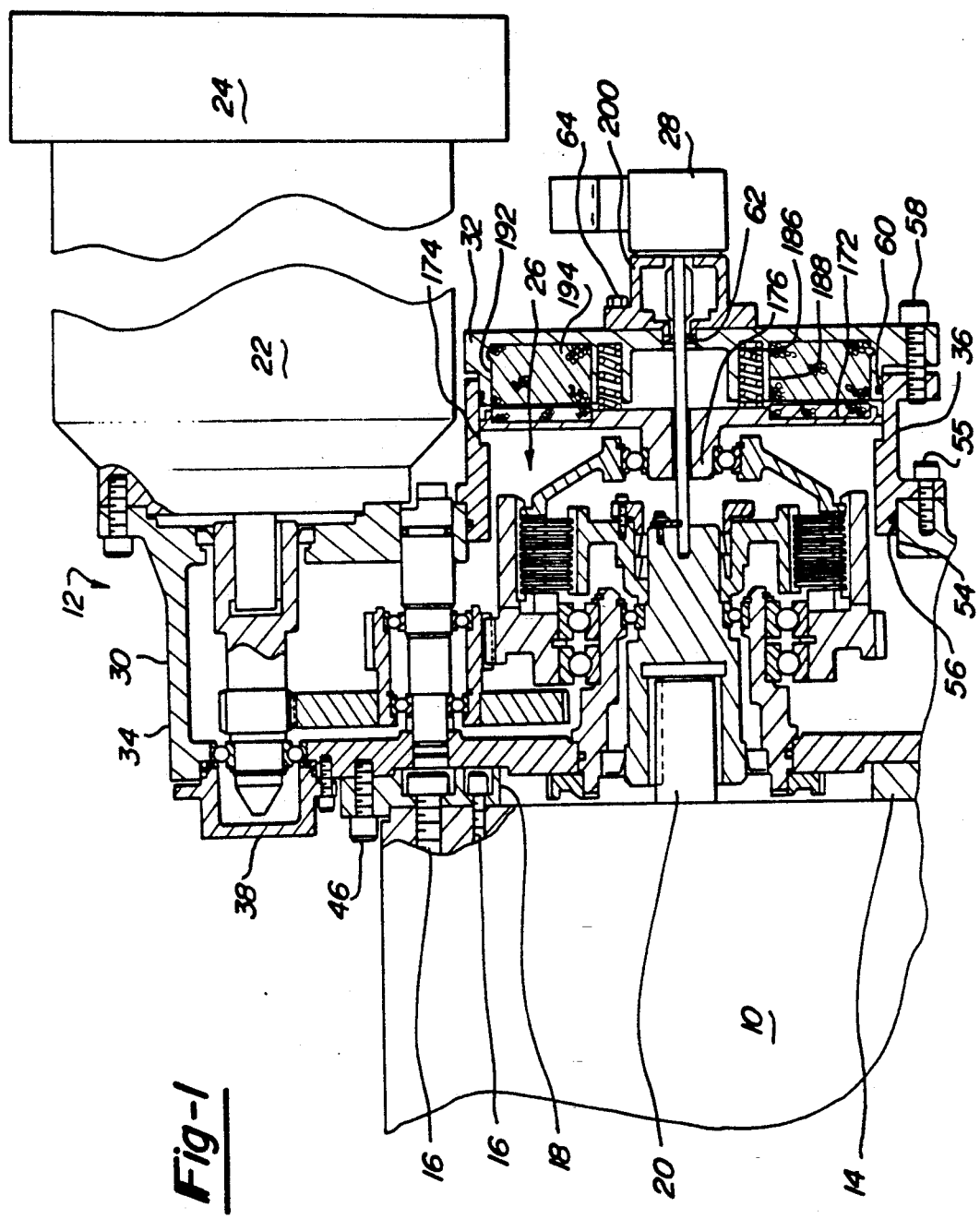
FIG. 1 is a longitudinal side section view partially in cross section of the two-speed drive unit of the present invention.
Figure 2:
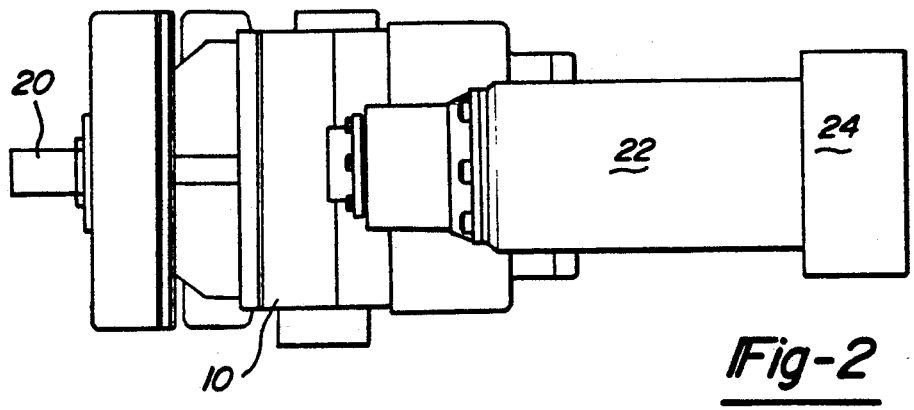
FIG. 2 is a top view of the two-speed drive unit shown in FIG. 1.
Figure 3:
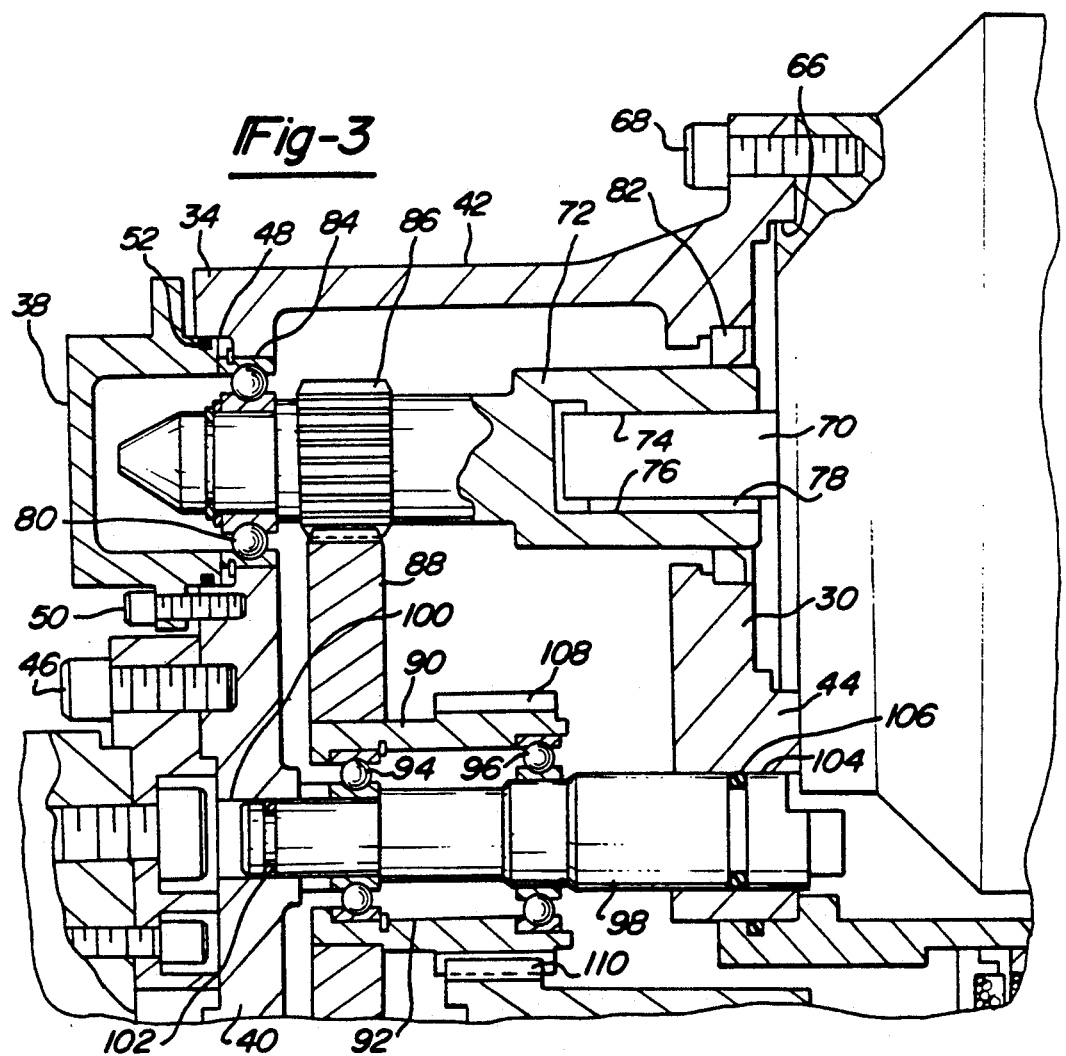
FIG. 3 is an enlarged view of the gearing used for the two-speed drive shown in FIG. 1.
Figure 4:
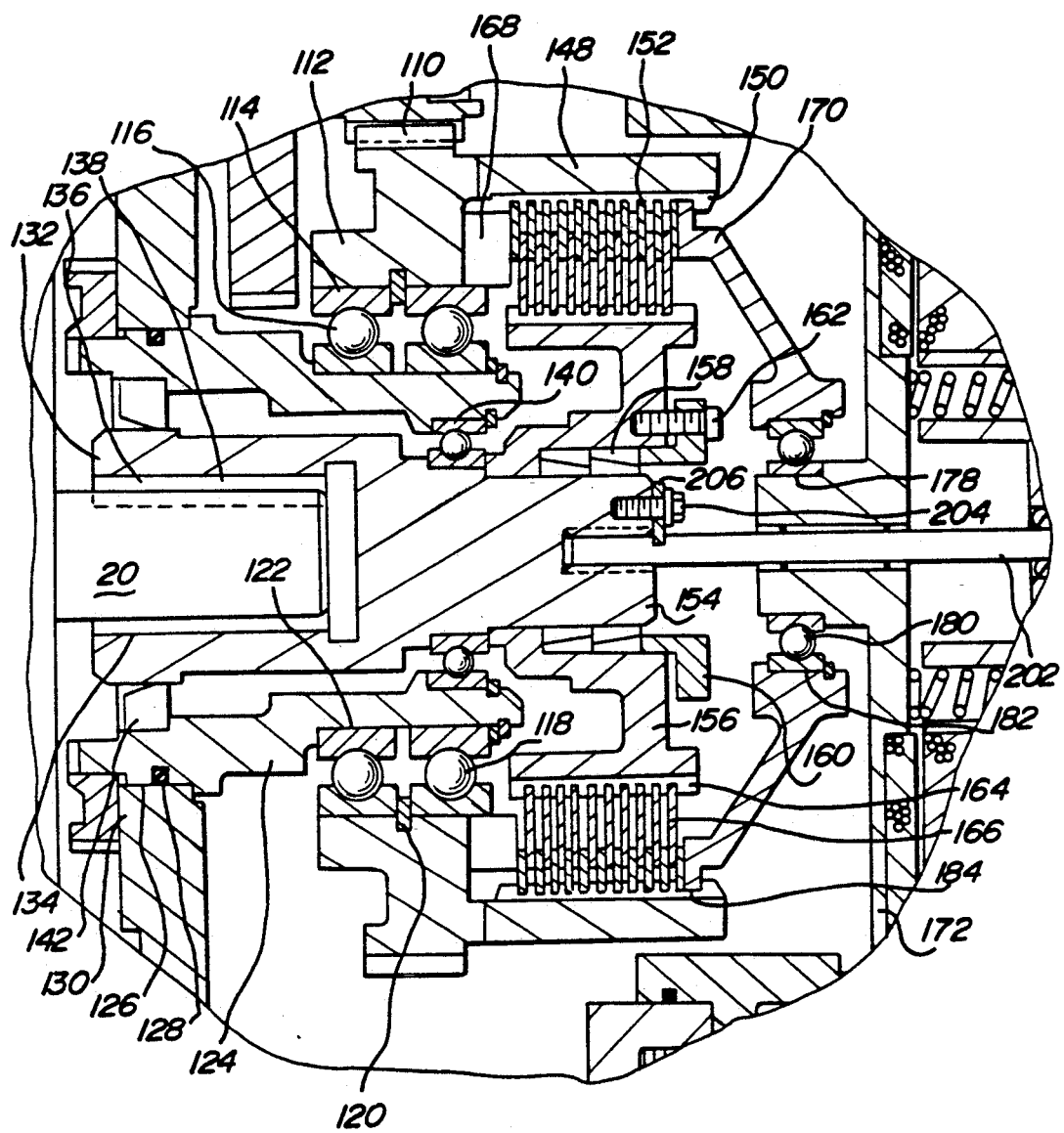
FIG. 4 is an enlarged view of the oil submerged clutch for the two-speed drive unit of FIG. 1.

Referring to FIGS. 1-4, a main motor drive unit 10 is illustrated which incorporates a two-speed drive unit 12 of the present invention. An adaptor plate 14 is secured to the rear of main motor drive unit 10 by a plurality of circumferentially spaced bolts 16. Adaptor plate 14 has a centrally located circular bore 18 which allows access to the rear of a main shaft 20 of main motor drive unit 10. Main shaft 20 extends through bore 18 for attachment to two-speed drive unit 12 as will be described later herein.

Two-speed drive unit 12 comprises a secondary motor 22, a secondary motor brake 24, a clutch 26 for engaging secondary motor 22 with the rear of main shaft 20 of main motor drive unit 10 to drive a machine (not shown) via main shaft 20 and a controlling computer (not shown) which is in communication with an encoder 28 for determining the position of the member driven by main shaft 20 at all times. Clutch 26 is enclosed by an oil-filled housing assembly 30 comprised of a clutch control housing 32, intermediate housing 34, an annular housing 36, and an end cap 38. Intermediate housing 34 is formed by a first end wall 40, an annular wall 42 and a second end wall 44. Intermediate housing 34 is secured to adaptor plate 14 by a plurality of circumferentially spaced bolts 46. End cap 38 is located in bore 48 in first end wall 40 and is secured to first end wall 40 by a plurality of circumferentially spaced bolts 50 and a suitable oil seal 52. The annular housing 36 is located in a bore 54 in second end wall 44 and is secured to second end wall 44 at its lower periphery by a plurality of circumferentially spaced bolts 55 and a suitable oil seal 56. Clutch control housing 32 is secured to the opposite end of annular housing 36 by a plurality of circumferentially spaced bolts 58 and a suitable oil seal 60. Encoder 28 is located in a bore 62 in clutch control housing 32 and is secured to the outside of clutch control housing 32 by a plurality of circumferentially spaced bolts 64.

Secondary motor 22 and secondary motor brake 24 are located in bore 66 in second end wall 44 and are secured by bolts 68 to second end wall 44 with a drive shaft 70 of secondary motor 22 extending into housing assembly 30. Secondary motor brake 24 is an electro-shear brake of a design well known in the art and is connected to drive shaft 70 such that when there is no power supplied to secondary motor brake 24, secondary motor brake 24 is in the applied condition thus prohibiting driveshaft 70 from rotating. When power is supplied to secondary motor brake 24, secondary motor brake 24 is released.

Driveshaft 70 telescopically engages an interior drive shaft 72 via a spline 74 on the internal bore 76 of interior shaft 72 and a key way 78 on driveshaft 70. Interior shaft 72 is rotatably mounted within housing assembly 30 by bearing 80 and appropriately sealed at the opposite end by a seal 82. Bearing 80 is mounted in a bore 84 in first end wall 40. End cap 38 provides the necessary clearance for interior shaft 72 to extend through bearing 80 and first end wall 40 of intermediate housing 34. A pinion gear 86 is disposed on interior shaft 72 and is rotatable therewith. Pinion gear 86 meshes with a first gear 88 which is mounted on a sleeve 90 wherein pinion gear 86 rotatably drives sleeve 90 via gear 88. Sleeve 90 has an internal bore 92 within which two bearings 94 and 96 are disposed. A non-rotating support shaft 98 extends from a bore 100 having a suitable seal 102 in first end wall 40 through bearings 94 and 96 into a bore 104 also having a seal 106 in oppositely disposed second end wall 44 of housing assembly 30 to support sleeve 90.

Sleeve 90 has a second gear 108 fixedly disposed at the outer periphery thereof, rotatable with sleeve 90, axially spaced from first gear 88, and generally having a different (smaller) diameter than first gear 88. This second gear 108 meshingly engages the teeth 110 of a first annular member 112. First annular member 112 has an interior bore 114 within which is disposed a pair of bearings 116 and 118 separated by a snap ring 120. Bearings 116 and 118 are mounted in an annular recess 122 around the outer periphery of an axially extending stationary annular sleeve 124 affixed to the inner periphery of bore 126 in first end wall 40 with a suitable seal 128 at the interface of first end wall 40 and sleeve 124. The interface comprises an annular groove 130 within which first end wall 40 is inserted. Either first end wall 40 or sleeve 124 are comprised of multiple pieces to facilitate assembly.

A cylindrical power transmitting member 132 disposed within sleeve 124 encapsulates and is connected to main shaft 20 within bore 134 of member 132. Member 132 has a spline 136 which is inserted within a key way 138 in shaft 20. Cylindrical member 132 is rotatably mounted within sleeve 124 by bearing 140 and appropriately sealed at its opposite end by a seal 142 which is disposed between sleeve 124 and cylindrical member 132.

Clutch 26 includes an extended annular portion 148, integral with first annular member 112, having a plurality of longitudinally extending drive lugs 150 disposed at circumferentially spaced locations along the inner periphery thereof. A series of friction clutch plate members, generally designated 152, are each provided with a plurality of circumferentially spaced, radially inwardly extending notches adapted for keyed engagement with the drive lugs 150.

Cylindrical power transmitting member 132 includes a cylindrical extended portion 154 which has an annular power transmitting member 156 fixedly disposed at the outer periphery thereof, rotatable with portion 154. Member 156 is fixedly attached to extended portion 154 by a pair of wedges 158 which are locked between extended portion 154 and member 156 by an annular compression ring 160. Compression ring 160 is secured to annular member 156 by a plurality of circumferentially spaced bolts 162. Annular power transmitting member 156 has a plurality of longitudinally extending circumferentially spaced splines 164 disposed at the radially outer periphery thereof. A series of friction clutch disc members, generally designated 166, are provided with internal notches complimentary to the splines 164 and adapted for splined engagement therewith. In assembly, the clutch plates 152 and discs 166 are interleaved between an abutment surface 168 and an engagement member 170 to be capable of engagement and disengagement via oil shear upon proper movement of engagement member 170 as will be discussed below.

A pressure plate 172 is disposed between clutch control housing 32 and clutch 26. Pressure plate 172 is located in an annular recess 174 around the inner periphery of annular housing section 36 and includes a cylindrical extending portion 176 extending towards clutch 26. Cylindrical extending portion 176 has an external surface 178 upon which bearing 180 is mounted. Engagement member 170 has an internal bore 182 within which bearing 180 is disposed. The external surface 184 of engagement member 170 is provided with a plurality of circumferentially spaced, radially inwardly extending notches adapted for keyed engagement with drive lugs 150 of extended annular portion 148. Thus, engagement member 170 moves axially with pressure plate 172 to engage and disengage clutch 26. A plurality of coil springs 186 are disposed within a plurality of circumferentially spaced cylindrical bores 188 located within clutch control housing 32. Coil springs 186 are positioned such that pressure plate 172 is biased to the left as shown in FIG. 1 thus engaging clutch 26 through engagement member 170 which moves axially within annular recess 174.

Clutch control housing 32 further defines an annular coil cavity 192 located radially outward from cylindrical bores 188. Disposed within coil cavity 192 is an AC voltage clutch coil 194. Upon application of power to the AC voltage clutch coil 194, pressure plate 172 is magnetically attracted and moves axially with engagement member 170 to the right as shown in FIG. 1. The magnetic attraction of AC clutch coil 194 overcomes the spring force of the plurality of coil springs 186. In this position, clutch 26 is released. When the power to clutch coil 194 is terminated, coil springs 186 urge the pressure plate 172 and the engagement member 170 to the left as shown in FIG. 1, engaging clutch 26.

Encoder 28 is secured to clutch control housing 32 by using an adaptor 200 which is bolted to clutch control housing 32 by the plurality of bolts 64. Encoder 28 receives its rotation information via a control rod 202 which telescopically engages extended portion 154 of cylindrical power transmitting member 132 via a spline 204 on an internal bore 206 of extended portion 154. Control rod 202 is held in place axially by a bolt 204 and washer 206 threadably received in extended portion 154. The opposite end of control rod 202 provides input to encoder 28. Encoder 28 has an output of 2000 counts per revolution. A 4-times divider circuit increases the effective counts to 8000 per revolution. Thus the encoder is capable of accurately predicting the rotative position of the main shaft 20 which in turn identifies the position of the driven apparatus.

While various modes of operation will be explained, it is to be understood that these are not the only modes of operation available and a person skilled in the art would be capable of defining other modes without departing from the proper scope and fair meaning of the present invention. One of the advantages of the present invention is that when power is lost, the main motor drive unit 10 and the two-speed drive unit 12 are both brought to a stop by the application of secondary motor brake 24 and the engagement of clutch 26.

Figure 5:
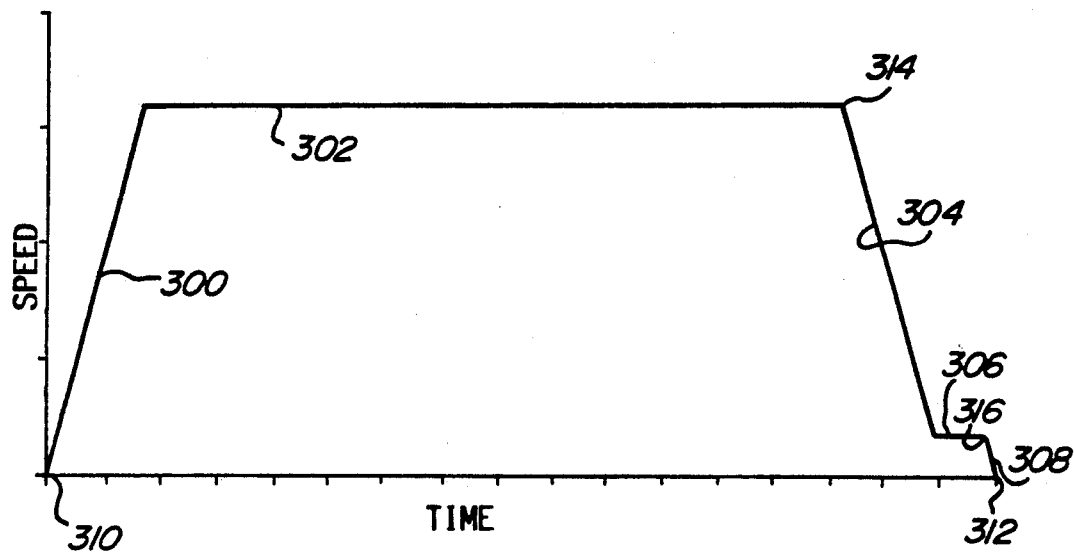
FIG. 5 is a motion diagram of a typical cycle which can be obtained utilizing the two speed drive apparatus of the present invention.

The first mode of operation is to use the inching capabilities of the two speed drive. Prior to operation of a cycle, the controlling computer must be "taught" the positions at which motor functions are to be changed. The motion diagram in FIG. 5 represents a typical motion curve achievable with the two speed drive unit of the present invention. The motion diagram in FIG. 5 comprises five stages of motion, an initial acceleration stage 300, a high speed stage 302, a high speed deceleration stage 304, a low speed stage 306 and a low speed deceleration stage 308. The start position 310 and the stop position 312 are fixed. The controlling computer must be "taught" where the high speed stage 302 ends, point 314 in FIG. 5, and where the low speed stage 306 ends, point 316 in FIG. 5.

The point 314, where the high speed stage 302 ends, is the point where the main motor drive unit 10 is disconnected and the clutch 26 is engaged. Prior art determines this point by using a limit switch. This means this position is fixed and the actual stop position is a variable caused by temperature of the clutch 26 and friction of the driven machine. The present invention allows the stop position to be fixed by allowing the stop command to be the variable. This greatly enhances the stopping accuracy of the system by nullifying the effect of temperature and machine friction. The encoder 28 mounted integral with the two-speed drive unit 12 keeps track of the driven member at all times. To "teach" the system, the controls are set to a LEARNING mode. The machine is then jogged to the position 314 which is the position where high speed stage 302 ends and a push button is depressed that tells the computer where position 314 is located.

In a similar manner, the point 316, where the low speed stage 306 ends, is also programmed into the computer. This information is stored on the computer's EPROM which is kept separate from the operating feedback of the machine so that plant engineers, set-up personnel or the machine operator never interface with the computer.

Once the initial stopping points have been entered, the machine is cycle 5 times after which the LEARN mode is exited. The machine is now ready for operation.

In operation, beginning with both motors 10 and 22 at rest, power is simultaneously provided to main motor drive 10, secondary motor 22, clutch coil 194 and secondary motor brake 24. The drive accelerates according to acceleration stage 300 in FIG. 5. Main motor drive 10 is free to operate without being affected by two-speed drive unit 12 due to the disengagement of clutch 26 by application of power to clutch coil 194. Secondary motor 22 is also free to operate independent of main motor drive 10 due to the disengagement of clutch 26 and the release of secondary motor brake 24. The drive is now operating in the high speed stage 302. When the machine reaches the preprogrammed point 314, power to main motor drive 10 and clutch coil 194 is terminated to affect a braking of main motor drive 10 from its full speed to the gear reduced speed of two-speed drive unit 12 as clutch 26 reduces the full speed of main shaft 20 of main motor drive 10 to the gear reduced speed of two-speed drive unit 12. This deceleration stage is shown as stage 304 in FIG. 5. Two-speed drive unit 12 can then continue to slowly move main shaft 20 and low speed stage 306 is entered. When the machine reaches preprogrammed point 316, power will be terminated to both secondary motor 22 and secondary motor brake 24 bringing main shaft 20 to a stop, as shown by low speed deceleration stage 308.

The controlling computer looks at the actual stop positions after each cycle and makes any correction necessary for the next cycle. After five production cycles, the controlling computer looks at the arithmetic average of the preceding five cycles to make any correction necessary on the next cycle. The computer also retains the arithmetic average of the first five cycles each time the machine has not been cycled for more than four hours. This information is used when the machine is restarted after not cycling for more than 4 hours.

The computer program can automatically set the time the machine will be in the low speed stage 306 before the final stop command to as short as 1/20 second. The computer will then not only calculate when the stop command, point 316, is to be initiated from an arithmetic average of the preceding five cycles but it will also determine when the slow down command is to be initiated, point 314, in order to maintain the preset time for low speed stage 306.

While the above description utilizes a two stopping position EPROM, EPROM's can be furnished with up to 20 stopping positions which gives them great flexibility in many automation applications.

Figure 6:
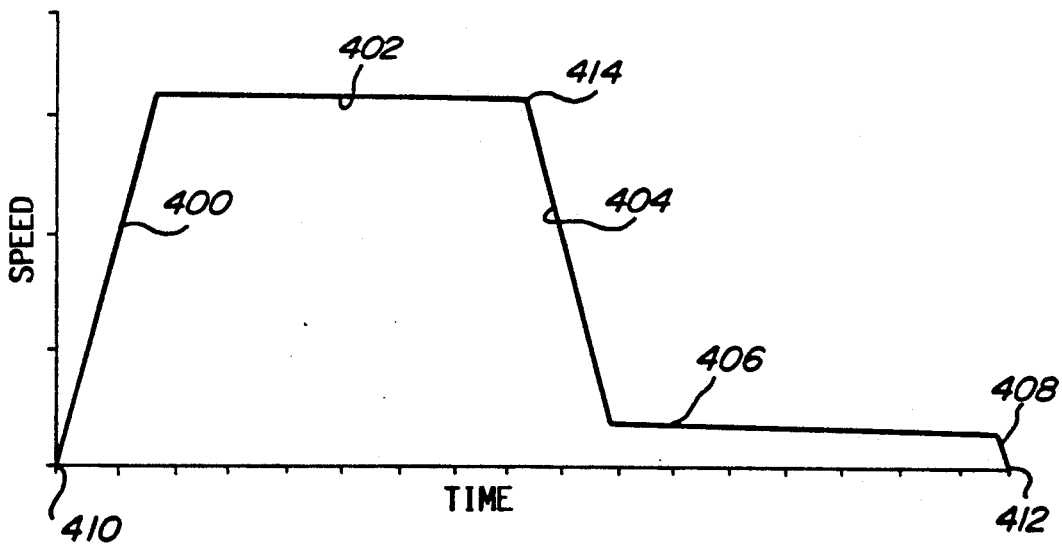
FIG. 6 is a motion diagram of another typical cycle which can be obtained utilizing the two speed drive apparatus of the present invention.

Another mode of operation is again to use the inching capabilities of the two speed drive. Again, prior to operation of a cycle, the controlling computer must be "taught" the positions at which motor functions are to be changed. The motion diagram in FIG. 6 represents an additional motion curve achievable with the two speed drive of the present invention. The motion diagram in FIG. 6 also comprises five stages of motion, an initial acceleration stage 400, a high speed stage 402, a high speed deceleration stage 404, a low speed stage 406 and a low speed deceleration stage 408. The difference between the motion diagram in FIG. 6 compared to that in FIG. 5 is the length of the low speed stage 406.

In applications similar to FIG. 6 where the two-speed drive is to be used as a feed drive, the controlling computer is simply supplied with a different EPROM. The sequence for the mode of operation shown in FIG. 6 is identical to that of the mode described for FIG. 5 as it applies to the "teaching" of the computer and the continuous recalculating of the stop positions. In this mode there is no need to maintain a specific time interval for the low speed stage 406 and thus the high speed stop point 414 is not recalculated based on the timing requirement only by the automatic average of the previous five cycles.

The additional modes discussed below can also utilize the two-speed drive unit's controlling computer by plugging in the appropriate EPROM into the computer or by switching to a manual mode.

An additional mode, beginning with both motors 10 and 22 at rest, would be to simultaneously provide power to both main motor drive 10 and clutch coil 194. The main motor drive 10 is then free to operate without being affected by two-speed drive unit 12 due to the disengagement of clutch 26 by application of power to clutch coil 194. When power to the main motor drive 10 is terminated, a controlled reduction of the voltage can be applied to clutch coil 194 to affect a programmed breaking as clutch 26 reacts through two-speed drive unit 12 and secondary motor brake 24.

An additional operational mode, again beginning with both motors 10 and 22 at rest, would be to simultaneously provide power secondary motor 22, clutch coil 194 and secondary motor brake 24. Secondary motor 22 is then free to operate independent of main motor 10 due to the release of secondary motor brake 24 and the disengagement of clutch 26. Two-speed drive unit 12 can then be systematically connected to main shaft 20 by terminating the voltage to clutch coil 194 which will engage clutch 26 and allow two-speed drive unit 12 to slowly move main shaft 20.

While it will be apparent that the preferred embodiment as illustrated herein is well calculated to fulfill the objects above stated, it will also be appreciated that the present invention is susceptible to modification, variation and change without departing from the proper scope and fair meaning of the subjoined claims.

What is claimed is:

1. A two-speed drive unit for an apparatus, said apparatus having a main housing and a main shaft operably associated with said main housing, said two-speed drive unit comprising:
   a two-speed drive housing secured to said main housing of said apparatus;
   secondary motor means for driving said two-speed drive unit, said secondary motor means having a drive shaft extending therefrom, said secondary motor means secured to said two-speed drive housing such that said driveshaft of said secondary motor means extends into said two-speed drive housing;
   first gear means disposed within said two-speed drive housing and operably associated with said secondary motor drive shaft;
   second gear means disposed within said two-speed drive housing and operably engaged with said first gear means;
   clutch means disposed between said second gear means and said main shaft for selectively engaging and disengaging said second gear means and said main shaft; and
   means operably associated with said two-speed drive unit for selectively controlling said apparatus, said secondary motor means and said clutch means, said selectively controlling means being continuously self-adjusting in order to maintain a pre-specified speed versus time relationship of said two-speed drive unit.

2. The two-speed drive unit of claim 1 wherein said clutch means comprises:
   an AC voltage clutch coil disposed within said two-speed drive housing; and
   a movable pressure plate operably associated with said AC voltage clutch coil wherein movement of said pressure plate in a first direction engages said second gear means with said main shaft, and movement of said pressure plate in a second direction disengages said second gear means from said main shaft.

3. The two-speed drive unit of claim 1 wherein said secondary motor means comprises:
   a secondary drive motor; and
   an electro-shear brake operably associated with said secondary drive motor; said electro-shear brake engaging said drive shaft to hold said driveshaft in a non-rotatable position when said electro-shear brake is in an applied condition.

4. The two-speed drive unit of claim 3 wherein said selectively controlling means is operably associated with said secondary drive motor and said electro-shear brake.

5. The two-speed drive unit of claim 1 wherein said selectively controlling means comprises:
   an encoder operably associated with said main shaft of said apparatus for determining the rotative position of said main shaft;
   computer means in communication with said encoder for selectively controlling said apparatus, said secondary motor means and said clutch means to position said apparatus in at least one predetermined position.

6. The two-speed drive unit of claim 5 wherein said computer means continually adjusts said at least one predetermined position based upon information received during at least one prior cycle of operation of said apparatus.

7. The two-speed drive unit of claim 5 wherein said computer means has Erasable Programmable Read Only Memory (EPROM) for storing said at least one predetermined position.

8. A two-speed drive unit for an apparatus, said apparatus having a housing and a main rotatable member operably associated with said housing, said two-speed drive unit comprising:
   a two-speed drive housing secured to said housing of said apparatus, said two-speed drive housing have a first and second portion;
   secondary motor means for driving said two-speed drive unit, said secondary motor means having a driveshaft extending therefrom, said secondary motor means being secured to said second portion of said two-speed drive housing such that said driveshaft of said secondary motor means extends into said second portion of said two-speed drive housing;
   first gear means disposed within said second portion of said two-speed drive housing, said first gear means fixedly secured to said drive shaft of said secondary motor means;
   second gear means rotatably disposed within said first portion of said two-speed drive housing and extending into said second portion of said two-speed drive housing, said second gear means operably engaged with said first gear means to be driven by said first gear means;

a sleeve rotatably disposed within said first portion of said two-speed drive housing, said sleeve fixedly secured to said second gear means for rotation therewith;

third gear means disposed on said sleeve and rotatable therewith, said third gear means spaced apart from said second gear means and disposed within said first portion of said two-speed drive housing;

fourth gear means rotatably disposed within said first portion of said two-speed drive housing, said fourth gear means operably engaged with said third gear means to be driven by said third gear means;

clutch means for selectively engaging said fourth gear means with said main rotatable member, said clutch means operatively disposed between said fourth gear means and said main rotatable member such that engagement of said fourth gear means with said main rotatable member permits said secondary motor means to drive said main rotatable member of said apparatus; and means operably associated with said two-speed drive unit for selectively controlling said apparatus, said secondary motor means and said clutch means, said selectively controlling means being continuously self-adjusting in order to maintain a pre-specified speed versus time relationship of said two-speed drive unit.

9. The two-speed drive unit of claim 8 wherein said clutch means comprises:
  an AC voltage clutch coil disposed within one of said first or second portions of said two-speed drive housing; and
  a movable pressure plate operably associated with said AC voltage clutch coil wherein movement of said pressure plate in a first direction engages said fourth gear means with said main rotatable member, and movement of said pressure plate in a second direction disengages said fourth gear means from said main rotatable member.

10. The two-speed drive unit of claim 8 wherein said main rotatable member and said sleeve have parallel axes of rotation.

11. The two-speed drive unit of claim 8 wherein said secondary drive means comprises:
  a secondary drive motor; and
  an electro-shear brake operably associated with said secondary drive motor; said electro-shear brake engaging said drive shaft to hold said driveshaft in a non-rotatable position when said electro-shear brake is in an applied condition.

12. The two-speed drive unit of claim 11 wherein said selectively controlling means is operably associated with said secondary drive motor and said electro-shear brake.

13. The two-speed drive unit of claim 8 wherein said selectively controlling means comprises:
  an encoder operably associated with said main rotatable member of said apparatus for determining the rotative position of said main rotatable member;
  computer means in communication with said encoder for selectively controlling said apparatus, said secondary drive means and said clutch means to position said apparatus in at least one predetermined position.

14. The two-speed drive unit of claim 13 wherein said computer means continually adjusts said at least one predetermined position based upon information received during at least one prior cycle of operation of said apparatus.

15. The two-speed drive unit of claim 13 wherein said computer means has Erasable Programmable Read Only Memory (EPROM) for storing said at least one predetermined position.

16. A two-speed drive unit for an apparatus, said apparatus having a main housing and a main shaft operably associated with said main housing, said two-speed drive unit comprising:
  a two-speed drive housing secured to said main housing of said apparatus;
  secondary motor means for driving said two-speed drive unit, said secondary motor means having a drive shaft extending therefrom, said secondary motor means secured to said two-speed drive housing such that said driveshaft of said secondary motor means extends into said two-speed drive housing;
  first gear means disposed within said two-speed drive housing and operably associated with said secondary motor drive shaft;
  second gear means disposed within said two-speed drive housing and operably engaged with said first gear means;
  clutch means disposed between said second gear means and said main shaft for selectively engaging and disengaging said second gear means and said main shaft;
  an encoder operably associated with said main shaft of said apparatus for determining the rotative position of said main shaft; and
  computer means in communication with said encoder for selectively controlling said apparatus, said secondary motor means and said clutch means to position said apparatus in at least one predetermined position.

* * * * *